Feb. 11, 1969

K. G. AHLÉN 3,426,876

MODULATING VALVE FOR HYDROSTATIC COUPLING

Filed Nov. 17, 1966

INVENTOR
KARL GUSTAV AHLÉN

BY Larson and Taylor

ATTORNEYS

INVENTOR
KARL GUSTAV AHLÉN

BY Larson and Taylor
ATTORNEYS

INVENTOR
KARL GUSTAV AHLÉN

BY *Larson and Taylor*

ATTORNEYS

Patented Feb. 11, 1969

3,426,876
MODULATING VALVE FOR HYDROSTATIC COUPLING
Karl G. Ahlén, Stockholm, Sweden, assignor to S.R.M. Hydromekanik AB, Stockholm, Sweden
Filed Nov. 17, 1966, Ser. No. 595,262
Claims priority, application Great Britain, June 24, 1966, 28,563/66
U.S. Cl. 192—61
Int. Cl. F16d *31/04;* F16k *25/00, 31/12*
34 Claims

ABSTRACT OF THE DISCLOSURE

A modulating pressure valve for controlling the flow of pressurized fluid from the high pressure side to the low pressure side of a hydrostatic coupling. Fluid in the high pressure side tends to open the valve but this same fluid is directed through a restricted passage to a chamber where it urges a piston to close the valve. A spring assists the closing movement. Controllable openings from this chamber to the low pressure side determine the extent of the closing force applied by the pressure in the chamber. An improved valve disc having opposing spherical surfaces cooperating with a seat and an actuating member, respectively.

---

This invention relates to valves, and more particularly it relates to a valve suitable for use as a modulating maximum pressure valve in a hydrostatic power transmission device such as a coupling or clutch.

In my earlier U.S. Patent No. 3,258,093, issued June 28, 1966, there is shown a hydrostatic power transmission device of the gear pump type particularly adaptable for use in transmitting power at relatively high rotative speeds as well as at low speeds. This type of hydrostatic coupling comprises a housing rigidly affixed to a first shaft of the coupling and containing, on the inner periphery of the housing a number of gears fixedly but rotatably mounted and arranged in pairs to serve as gear pumps. A central sun gear is attached to a second shaft of the coupling and cooperates with one gear of each gear pump. The low pressure side of the pump is located adjacent the central sun gear and the high pressure side of the pump is located within a cavity on the side of the gear pump away from the central sun gear. A passage from this cavity extends through a portion of the housing and empties into the low pressure side of the pump.

The operation of this type of coupling is controlled by modulating the valve which controls the opening from the high pressure cavity of the gear pumps back to the low pressure portion of the housing. If this valve is completely open, then as one shaft, for example the second shaft which has the central sun gear mounted thereon, is turned relative to the first shaft, then the gears of the gear pumps in engagement with the sun gear will rotate about their axes thereby directing fluid from the low pressure side of the housing through the pumps and back through the open valve to the low pressure side of the housing. Fluid will circulate relatively freely, and the first shaft may remain stationary while the second shaft is rotating. If the valve is completely closed, however, then the pressure on the high pressure side of the pumps will build up to a point whereat the gears of the gear pumps will practically no longer rotate. At this point the gears of the gear pump in engagement with the sun gear must be carried around with the sun gear as the second shaft rotates. In this manner, a coupling effect is provided from the second shaft, through the gears of the gear pump to the outer housing in which the gear pumps are fixedly but rotatably mounted, and to the first shaft. It can be seen that by modulating the opening of the valve it is possible to provide different degrees of relative movement between the two shafts. It is also evident that the shaft connected to the outer housing could also serve as the driving shaft while the second shaft containing the central sun gear could serve as the driven shaft, depending on relative direction of rotation and on the manner of mounting of the gear pump elements.

By way of definition, the valve which serves to control the passage opening may be referred to as a "maximum pressure valve" since its operation is usually responsive to pressure conditions within the hydrostatic coupling. The valve of the present invention may also be referred to as a "modulating valve" since it allows very precise regulation, or "modulation" of the valve opening.

The purpose of the present invention is to provide a vastly improved modulating maximum pressure valve for controlling the operation of a hydrostatic coupling or clutch by modulating the opening in the valve passage leading from the high pressure side of the pumps to the low pressure portion of the housing.

In view of the extremely important role which the maximum pressure valve plays in controlling the overall operation of the hydrostatic coupling or clutch, it can be seen that the design of this valve becomes extremely important. In designing an adequate maximum pressure valve located at a relatively large distance from the axis of rotation of a rotatable housing there are at least three significant problems which must be remedied. The first is to obtain a precise and adequate closing of the valve member on its seat. The second problem is to provide a valve which opens and closes under the influence of very small differences of pressure. The third problem is to obtain the necessary and desired opening and closing characteristics of the valve to provide the design operating characteristics of the transmission device in relation to the rotating speed.

Although the problems outlined above are important in most hydrostatic power transmission devices, they are particularly important in the case of the type of hydrostatic power transmission device, as shown in the above noted Patent No. 3,258,093, since these devices are designed for slip as low as ½% at maximum speed and maximum torque.

The third main problem noted above is to obtain desired opening and closing valve characteristics. The desirable characteristic sought by the present invention is to follow as closely as possible the characteristics of the normal engine torque. To accomplish this, it is desirable to let the maximum pressure valve open at idling speeds at a low pressure to obtain at that point a gentle engagement between the two parts of the coupling. After this coupling is obtained it is desirable that the valve should be closed at normal maximum torque transportation through the coupling so that the two parts will be in normal driving engagement. However, it is also desirable to reopen the valve when a driving torque has been obtained which is 10 to 30% greater than the maximum torque of the engine which drives the driving shaft of the coupling. The purpose of this opening characteristic is to assure that the coupling will always be able to deliver the maximum torque potential of the engine, but at the same time eliminate additional stresses on the coupling and connected parts which would result from torque shocks if the coupling were designed to deliver a torque much greater than the maximum available engine torque.

Many different arrangements in maximum pressure valves are known. For example, as shown in the Patent No. 3,258,093 it is possible to use centrifugal force to open or close the valve. Also the effect of centrifugal force may be eliminated by mounting the valve so that the valve body is movable in a direction parallel to the axis of rotation of the coupling. It is also possible to employ a spring, loaded by a member movable by centrifugal force. There is also known a maximum pressure valve which is loaded by a flyweight external to the valve and operated by centrifugal force. In still another arrangement it is possible to control the valve by using oil under pressure from an outside source. While these previous maximum pressure valves are quite useful in hydrostatic couplings, they are generally very limited in their operation and cannot provide the desirable operating characteristics sought by the present invention. Nor do they lend themselves to a solution of all three problems outlined above.

Thus, it is an object of this invention to provide a modulating maximum pressure valve which (1) provides rapid opening and closing points with relatively small pressure differentials in the opening and closing pressures, (2) allows passage of only a very small quantity of oil when closing and (3) provides the desired operating characteristics of opening at lower pressure at idling speeds, and then opening again at a certain predetermined oil pressure at speeds above the idling speeds.

Briefly, the modulating maximum pressure valve according to the present invention is constructed in the following manner. A valve seat and a valve disc are mounted to move towards and away from the valve seat. To urge the valve disc towards the valve seat there is provided, first, a biasing means and second, a hydraulic piston and cylinder. Means are provided for passing fluid into the piston and cylinder through a restricted passage from the primary side of the valve disc, that is, the side facing the passage from the high pressure side of the gear pumps. The biasing means is designed to prevent passage of fluid through the valve below a predetermined fluid pressures. The piston has a working surface of an area smaller than the area on the primary side of the valve disc. Consequently, when the pressure on the primary side of the valve disc equals the pressure in the piston, then the hydraulic force of the piston will be insufficient for closing the valve disc against the seat. However, the hydraulic force of the piston together with the force exerted by the biasing means will be sufficient to urge the valve disc against the seat. The amount by which the effective surface area on the primary side of the valve disc exceeds that of the piston will vary depending upon the particular operating characteristics that are desired. However, in a preferred embodiment of the invention the effective area of the piston may be between 65 and 75% of the effective area on the primary side of the valve disc.

As noted above, the hydraulic piston cylinder is supplied with fluid through a restricted passage from the primary side of the valve disc. The cylinder further includes a means for bleeding fluid from the cylinder to the low pressure portion of the housing. Basically it is by controlling the quantity of this bleeding, in relation to the quantity of fluid supplied to the cylinder through the restricted passage, that the modulation of the valve is effected.

Two separate bleed means are provided for controlling the quantity of fluid bled from the piston cylinder. The first bleed means is operable to reduce the quantity of bleed fluid under the influence of centrifugal force; and the second bleed means is operable to increase the quantity of bleed fluid in response to a predetermined pressure within the piston cylinder.

During a first stage of operation the first, or centrifugally operable bleeding means is maintained in an open condition so that fluid entering the piston will be bled freely therefrom so that pressure within the cylinder will remain below the pressure on the primary side of the valve disc. At this time the main force acting to close the disc against the seat will be the biasing means which must act against the differential pressure force urging the valve disc to open.

At a predetermined speed of rotation of the housing (which contains the valve structure) the centrifugally operable bleeding means acts to close the bleed passage so that pressure within the piston will increase, approaching the pressure on the primary side of the valve disc. Consequently the piston force will augment the force exerted by the biasing means to close the valve disc against the valve seat. Also, as the speed increases centrifugal force will act upon the mass of the piston, the biasing means and the valve disc to urge the valve disc toward the closed position.

With the piston bleed passage in a closed position the pressure in the piston cylinder will continue to increase as will the centrifugal force and these two forces together with the biasing means will cause the valve side to remain closed against the valve seat as the speed of the hydraulic coupling and the pressure upstream of the valve disc increases.

The hydrostatic coupling is now in full engagement and could be maintained in this condition to have the driving shaft drive the driven shaft. However, according to a purpose of this invention it is desired to let the valve disc open again above a pressure corresponding to the pressure obtained when the hydrostatic coupling is carrying over a torque approximately 10 to 30% greater than the maximum engine torque.

This full engagement and reopening of the valve are accomplished as follows. After the first bleed passage has closed, the pressure within the piston cylinder mounts and this pressure together with the biasing means and the increased centrifugal force keeps the disc firmly against the valve seat. Since the effective area on the primary side of the valve exceeds that of the piston, then assuming equal pressure on both sides, as the pressure increases the pressure force differential (pressure $x$ area) acting to open the valve will increase. A point will be reached whereat the differential pressure force exceeds both the force of the biasing means and the centrifugal force. At this point the valve disc will open and the curve of torque versus speed will level off slightly. However, as the speed increases so will the centrifugal force acting to close the disc. Thus while the curve has leveled off slightly it would now tend to become steep once again.

To modulate the valve in the desired manner it is important to provide an additional bleed means to act in response to a second and higher predetermined pressure level to reopen the bleed passage from the piston to the low pressure portion of the housing. The torque versus speed curve, which has been rising fairly sharply, will now level off to a large extent rather than increase continuously. Thus, in the present invention undesirable high torque transport through the hydrostatic coupling is avoided.

The said valve disc is separate from the piston; and the contact surface between the piston and the disc forms part of a spherical surface having its center on that side of the disc opposite the piston. The cooperating surfaces of the valve disc and the seat may also be spherical in which case the centers of these spherical surfaces would be located on the same side of the disc as the piston. Alternately, the valve seat may be a conical surface designed to cooperate with the part spherical surface of the valve disc. With this structure proper closing of the valve disc would be obtained in a manner to be described in greater detail below. To assure proper closing of the valve disc, the valve seat, valve disc and piston surfaces may be treated to obtain low friction characteristic.

Thus, it is an object of this invention to provide a vastly improved modulating valve suitable for use as a maximum pressure valve in a hydraulic clutch or coupling.

It is a further object of this invention to provide a modulating valve which is operative to be opened first by a low pressure, below a certain speed and then to be closed up to a second pressure partly depending on speed and finally above a certain pressure to be opened principally above a third and higher pressure.

It is still another object of this invention to provide a modulating valve operative to be opened by the flow of pressure upstream from the valve and operative to be closed by a biasing means and a hydraulic piston and cylinder means, wherein the latter means is controlled by a first bleed passage operable by centrifugal force and a second bleed passage operable in response to a predetermined pressure.

It is another object of this invention to provide a valve disc and a valve seat which will close completely even when the disc and seat are slightly misaligned.

Other objects and the attendant advantages of the present invention will become apparent from the detailed description to follow of a preferred embodiment of the invention, together with the accompanying drawings wherein.

Figures 1, 2:
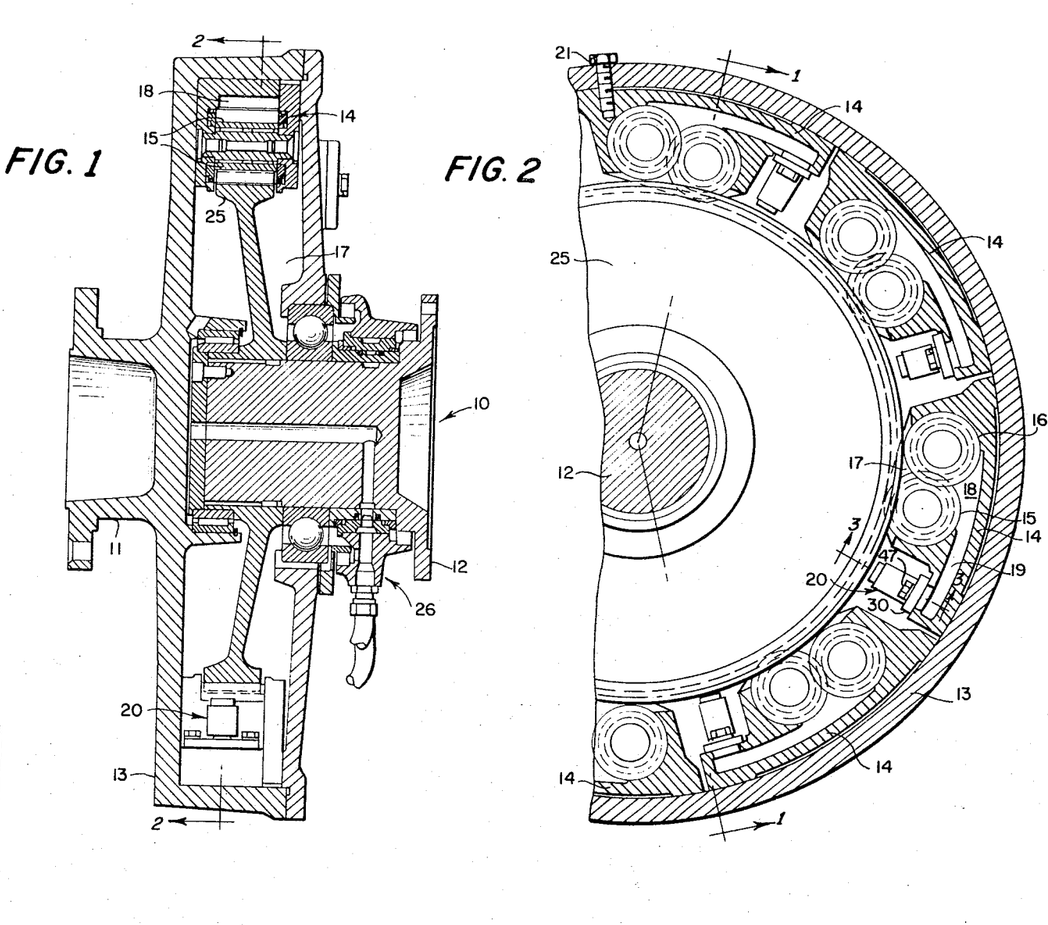
FIGURE 1 shows a hydrostatic transmission device in which the modulating maximum pressure valve of the present invention, taken along the line 1—1 of FIGURE 2.
FIGURE 2 is a sectional view of a hydrostatic coupling taken along line 2—2 of FIGURE 1.

Referring to FIGURES 1 and 2 there is shown a hydrostatic coupling transmission of the type shown generally in Patent No. 3,258,093 and in which the modulating maximum pressure valve of the present invention is to be incorporated.

The hydrostatic coupling can serve the purpose of transmitting power between a first shaft 11 and a second shaft 12. Either shaft may serve as the driving shaft while the other serves as the driven shaft, depending on the mounting of the pump elements and the direction of driving. However, for purposes of illustration the second shaft 12 will be assumed to be the driving shaft and first shaft 11 the driven shaft. An outer housing member 13 is rigidly attached to the shaft 11. A plurality of gear pump units 14 are located around the inner surface of the housing periphery and are held to the housing by suitable connecting means such as bolts 21. A number of such gear pump units are shown in FIGURE 2 while one such unit is shown at the top of FIGURE 1. Each gear pump unit comprises a main gear 15 and an idler gear 16 which is driven by the main gear 15. When the main gear 15 is turned counterclockwise (as shown in FIGURE 2) fluid is pumped from a low pressure portion of the housing 17 to a high pressure chamber 18. From this high pressure side the fluid passes through a passage 19 to the maximum pressure valve 20 and back to the low pressure portion of the housing. Turning of the gear 15 is provided by its engagement with the sun gear 25 which is rigidly fixed to the second shaft 12.

It can be seen from FIGURE 2 that if the gear 25 is rotated clockwise relative to the outer housing 13 then fluid will be pumped through the gear pump to the high pressure chamber 18. If the valve 20 is open the fluid will pass through passage 19 and valve 20 back to the housing 17. With the valve wide open and the effect of the spring eliminated the outer housing 13 will only be subjected to a small torque urging it to move with the gear 25. Consequently it can remain stationary as the gear pumps simply circulate the fluid therethrough. However, if the valves 20 are completely closed it can be seen that the pressure at chamber 18 will reach a level whereat the pump will no longer turn to carry fluid to the chamber 18 except to compensate for volumetric losses. At this point the outer housing 13 and all the gear pump units affixed thereto will be practically carried with the gear 25 and shaft 12 so that rotary motion will be transmitted from the shaft 12 through the gear 25 and outer housing 13 to the shaft 11.

Referring to FIGURE 1 there is shown generally a fluid circulation system 26 for circulating low pressure fluid to and from the portion 17 of the coupling. FIGURE 1 also illustrates a number of suitably placed bearings and connecting means. However, since the operation of these elements are self-evident, and since they form no part of the present invention, they will not be described in further detail.

Figures 3, 4, 5:
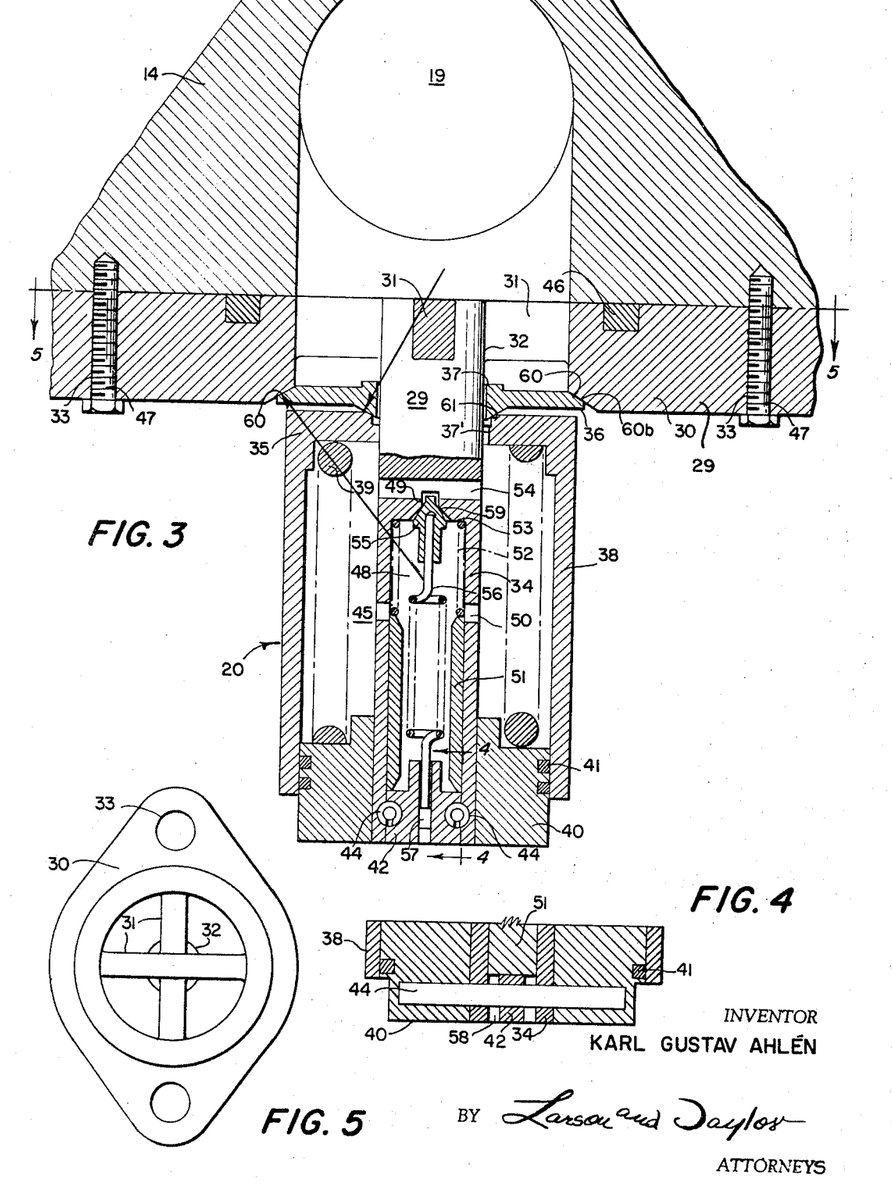
FIGURE 3 illustrates a modulating valve according to the present invention shown mounted in a hydrostatic coupling transmission, and indicated at line 3—3 of FIGURE 2 but expanded in size.
FIGURE 4 is a partial sectional view taken along line 4—4 of FIGURE 3.
FIGURE 5 is a plan view of the valve taken along line 5—5 of FIGURE 3.

Referring now to FIGURES 3–5 there is shown in detail a preferred embodiment of a modulating maximum pressure valve according to the present invention.

Referring to FIGURE 3 there is shown first a member 29 which has a generally T-shaped cross section. This element is shown in plan view in FIGURE 5. It comprises an outer portion 30 having flanges which extend outwardly to a sufficient extent to provide bolt holes 33 for connecting the valve 20 to the pump unit 14, for example by bolts 47. Radially extending flanges 31 connect the outer portion 30 to a central stem portion 32. This stem 32 extends downwardly away from the plane of the outer portion 30 and contains thereon and therein the remaining elements of the valve. The spaces provided between ribs 31 are aligned with the passage 19 from the high pressure chamber 18 of the pump unit. Sealing ring 46 is provided for sealing the area between the outer portion 30 and the pump unit 14.

A valve disc 36 encircles the stem 32 at the upper portion and is adapted to be urged toward the valve seat 60b on the outer portion 30 to make closing contact therewith at contact surface 60. A restricted passage 37 is provided in the valve disc 36 for a purpose to be described in greater detail below.

Immediately below the valve disc 36 there is provided a hollow cylindrical piston 38 having an end wall 35 which is adapted to urge the valve disc 36 against the valve seat 60b making contact with the valve disc 36 at contact surface 61. A restricted passage 37' is provided in the end wall 35 which passage communicates with restricted passage 37 at one end and with a chamber 45 within the piston 38 at its other end. Thus, passages 37 and 37' provide a restricted passage for pressure fluid from passage 19 into the chamber 45.

The lower portion of stem 32 is hollowed out to form a hollow tube-like portion 34 forming a second, or "bleed" chamber 48. Surrounding the lower end of this hollowed portion 34 is an end plate 40 which is rigidly secured to the portion 34. The end plate 40 extends outwardly to the cylindrical sidewall of piston 38 and is sealed therefrom by sealing ring 41. Thus, the piston 38 together with end plate 40 and the stem 32 form the annular pressure chamber 45. As will be evident from the structure of the valve, a buildup in pressure in chamber 45 will tend to urge the end wall 35 of piston 38 against the valve disc 36 forcing the same against the valve seat 60b. Also located within chamber 45 is a main spring 39 which also acts against end wall 35 to urge valve disc 36 against the valve seat 60b.

As stated above, the lower end of stem 32 is hollowed out to form a chamber 48. This chamber is open at all times through passage 58 (see FIGURE 4) to the low pressure portion 17 of the housing.

Two passages are provided from the chamber 45 to the chamber 48. A first passage includes apertures 50 in the side of the hollow portion 34. A cylindrical sleeve 51 is mounted within the tubular portion 34 and is urged by a compression spring 52 in such a position as to expose the aperture 50. At its lower end the sleeve rests upon a stem end piece 42. This stem 42 is rigidly secured to the members 34 and 40 by means of pins 44 as shown in FIGURES 3 and 4. As noted above, passages 58 are provided in the member 42 to insure that fluid can escape at all times from the chamber 48 to the exterior of the valve structure. The sleeve 51 is so mounted within the valve 20, and the valve 20 is so mounted on the outer housing 13 of the hydrostatic coupling that when the speed of the outer housing is increased centrifugal force will cause the member 51 to move towards the end 53 of the chamber 48, against the force of spring 52, thereby covering the apertures 50.

A second valve means 55 is also provided within the hollow portion 34. This valve member 55 rests upon a seat 59 thereby closing passage through holes 54 and 49 from chamber 45 to chamber 48. This valve is normally held in the closed position by means of compression spring 56, which spring is attached to an adjusting means 57 at its lower end. The adjusting means 57 may be positioned at any axial position within the member 42 thereby controlling the force exerted by the compression spring 56 to close valve member 55. It should also be noted that the valve member 55 closes when urged in an outward direction so that this valve cannot be opened but in fact is urged shut more tightly by the effects of centrifugal force as the outer housing of the hydrostatic coupling is rotated.

Figures 7, 8:
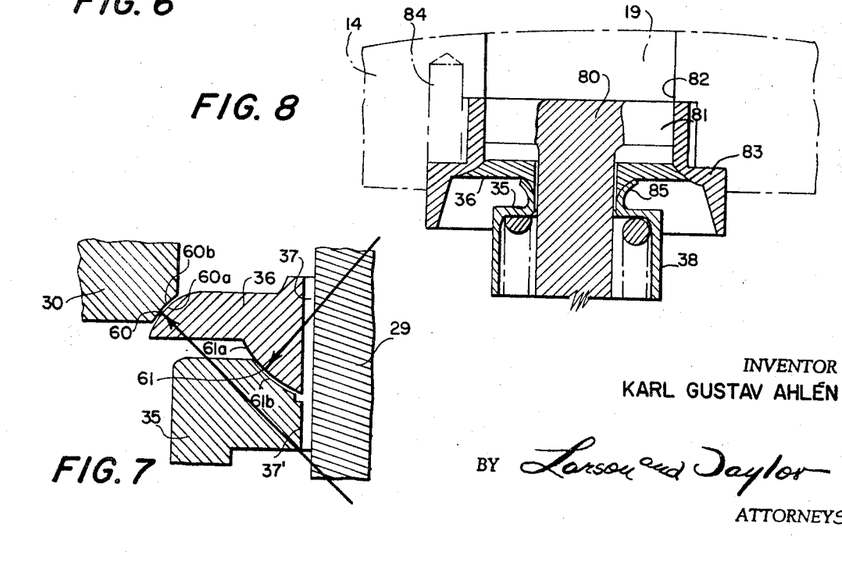
FIGURE 7 is an expanded view of a portion of the valve.
FIGURE 8 is a partial section view of the valve showing a modification thereof.

Referring to FIGURE 7, the nature of the valve disc 36, in particular the contact surfaces 60 and 61 are shown in greater detail. The construction is such as to assure closing of the valve regardless of misalignments of the valve disc 36 with respect to the seat 60b. The cooperating surfaces 60a and 60b at contact surface 60 between the outer portion 30, and the valve disc 36 and the cooperating surfaces 61a and 61b between valve disc 36 and the piston end wall 35 are part spherical. As can be readily observed in FIGURE 7 the spherical center of each part spherical surface is located on the side of the valve disc 36 opposite from that said part spherical surface. Because of this construction the valve will close independent of the effects of centrifugal force or uneven movement of the valve disc relative to the valve seat in a transverse direction, that it, the valve disc 36 will be self-adjusting within the valve seat 60b. This is so for two reasons. First, the valve will seat correctly independently of whether or not the part spherical surfaces are central with respect to the center line of the seat, and secondly because the valve disc 36, when moving from an open to a closed position will adjust itself to have contact at least around one complete line at the surface 60. Owing to possible misalignments of the seat this contact line might well be oval. Nonetheless, it will be a complete closed curve and thus will effectively close the valve.

The valve disc 36 is separated slightly from the stem 29 by annular passage 37. It is also noted that part spherical mating surfaces are provided, 61a and 61b, at contact surface 61. Because of this construction only a very slight force applied by the piston wall 35 against the disc 36 will be required in order to close the valve 36 against the seat 60b. It should also be noted that the same results could be obtained if the surface 60b were conical instead of spherical. Because of this construction, a large amount of precision is not required in manufacturing the valve seat 60b.

It should be noted however, that in either situation, the valve member 36 must be sufficiently flexible, or elastic, to yield under the force of misalignment to provide a completely closed curved surface, if necessary, with the valve seat 60b.

The operation of the preferred embodiment of the invention will now be described with respect to FIGURES 3 through 5 and the graph of FIGURE 6.

Figure 6:
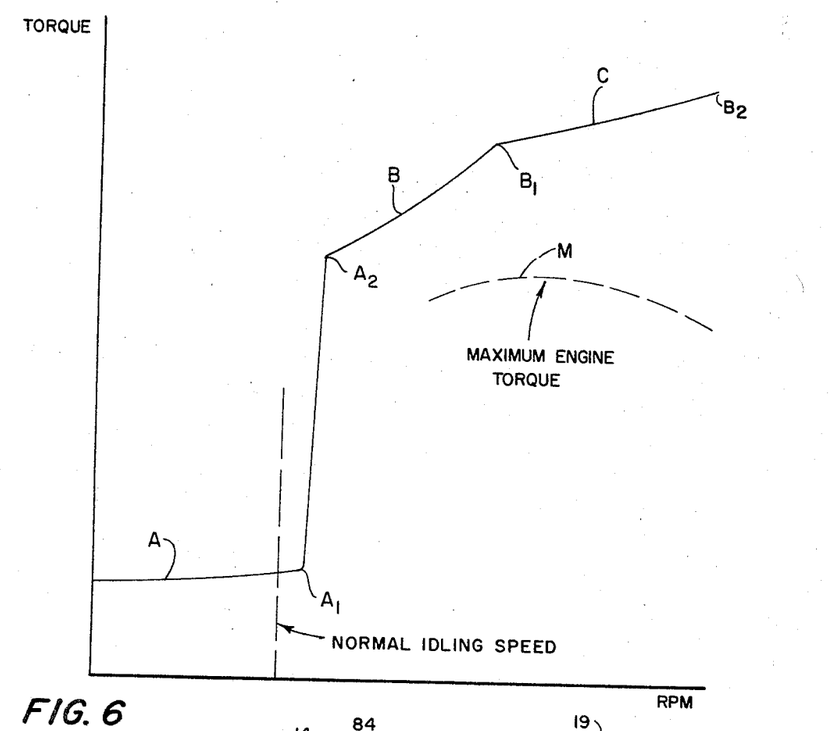
FIGURE 6 is a graph of torque versus engine speed and shows the opening and closing characteristics of the valve.

FIGURE 6 is a graph of torque versus speed. The solid line in the graph of FIGURE 6 illustrates the torque transmitted by or through the hydrostatic coupling as a function of the speed of the engine which is, when engaged, practically the speed of the driving shaft of the hydrostatic coupling. The line in FIGURE 6 illustrates a typical torque versus speed curve for an engine used to provide the input torque to the hydrostatic coupling. Generally, it is noted that at portion A, at very low speeds, such as idling speeds, the hydrostatic coupling carries over very little torque, since, with the modulating valve of the present invention very little force is required to open the valve. After idling speed, for example at point $A_1$ the forces acting on the valve act to close the valve so that the carried over torque increases immediately to a much higher level as indicated at $A_2$. At point $A_2$, additional forces acting on the valve i.e. centrifugal forces cause an increase of the opening pressure, as indicated at portion B. This slope continues until the speed indicated at point $B_1$ at which time the oil pressure acting on the bleeding valve causes an easier opening of the valve so that the torque curve levels off considerably as shown at part C. In the preferred operation of the present invention the points $B_2$ and $B_1$ will be approximately 10–30% above the maximum torque point M on the maximum engine torque curve.

Referring now to the preferred embodiment of the invention it is first desired that below a predetermined speed the valve mechanism should open easily, that is, the valve disc 36 should be allowed to separate from the valve seat 30 under the action of a fairly slight increase in the pressure of the fluid in passage 19. This would be represented by the portion A on the curve of FIGURE 6 up to point $A_1$. To accomplish this result the fluid entering the chamber 45 through restricted passages 37 and 37' is allowed to escape freely through apertures 50 to the bleed chamber 48 and from there through outlet 58 to housing portion 17. Consequently the pressure within the chamber 45 remains below the pressure in the passage 19. This fluid release through apertures 50 will continue as long as the spring 52 urges the sleeve 51 away from the apertures 50. It should be noted, however, that during this early stage of operation the valve 55 is held firmly in engagement with seat 59 through the action of spring 56. With the valve in this condition only the main spring 39 acts to urge the valve disc 36 to the closed position. Since this spring will at all times exert a constant force, plus some force due to centrifugal force, the curved portion A is never zero, since some torque, and thus some increase in pressure in the chamber 19, will be necessary to offset the force of spring 39. However, the force of spring 39 is so chosen that only a low force need be applied to offset the force of the spring and open the valve. During this portion A it is important that the apertures 50 be left completely open. Therefore, the spring 52 must be strong enough to keep the sleeve 51 away from the apertures 50 in view of the progressively increasing centrifugal force that will tend to urge the sleeve 51 over the apertures 50 as the rotary speed of the housing is increased within the idling range A. This low pressure indicated by the portion of the torque curve A should preferably be lower than 1/3 of the normal maximum torque. This results in a very soft and gentle interengagement of the two portions of the hydrostatic coupling. The engine speed will reach point $A_1$ at which point it is desirable to rapidly increase the torque delivered by the hydrostatic coupling. This is indicated by the portion of the curve between $A_1$ and $A_2$.

To provide the increase in torque between $A_1$ and $A_2$, the characteristics of sleeve 51 and spring 52 are so chosen that at point $A_1$ the centrifugal force acting on the sleeve 51 will overcome the force exerted by spring 52 thereby covering apertures 50. At this point, since fluid can no longer leave the chamber 45, the pressure therein will build up to the pressure in passage 19 thereby exerting a greater force against the end wall 35 and the disc 36 to close the latter against the valve seat 60b. Thus, the force urging the disc 36 to a closed position now includes not only the spring force but also a greater hydraulic force within the piston 38. During this portion from $A_1$ to $A_2$ the closing force resulting from the rotating masses including the disc 36, the piston 38 and the spring 39.

It is to be noted that the effective pressure area on the primary side of the valve disc 36 in passage 19 is greater than the effective pressure area of the wall 35 acted upon by the pressure within chamber 45. Consequently, as the pressure in passage 19 and in the piston 38 steadily increases, a pressure will be reached within the passage 19 whereat the pressure force exerted on the primary side of disc 36 (pressure x area) will exceed the pressure force of the piston by an amount sufficient to offset both the closing force of the spring and the centrifugal force, thereby causing at least a slight separation of the disc 36 from the value seat 60b. This is represented on the curve by the portion labeled B starting from point $A_2$. Preferably, the effective area of the piston may be between 65 and 75% of the effective area on the upstream or passage 19 side of the valve disc 36.

As the speed of the engine is further increased a point will be reached at which the delivered torque is approximately 10–30% above the maximum engine torque. If no further modulation of the bleed passage were provided, then the delivered torque of the coupling would continue to increase along an extension of line B owing to the increased centrifugal force applied by the elements 36, 38 and 39 to close the disc 36. However, this excess torque is unnecessary and undesirable. Therefore, to provide the desired opening characteristics there is provided in the present invention, a mechanism for practically offsetting this increased centrifugal force and thereby allowing lighter opening of the valve at high oil pressure values, as indicated by the portion of the graph labeled C.

The means for offsetting the additional centrifugal force to level the curve, as shown at C, is provided by reopening the communication between passage 45 and bleed chamber 48 at a certain predetermined pressure. This opening is provided by so designing the valve 55 that it will open against the centrifugal force and the force of spring 56 practically at a predetermined pressure in chamber 45 thereby allowing fluid to flow through passages 54 and 49 to the chamber 48 and from there through the channel 58 to the low pressure portion 17 of the housing. While the force of spring 39 and the centrifugal force will continue to act upon the disc 36, nevertheless the hydraulic force exerted by piston 38 will be reduced enough to allow opening of the valve 36 from the seat 60b as desired.

It is apparent that the particular shape of the characteristic curve in FIGURE 6 can be varied by changing the dimensions of the parts and the spring forces within the modulating valve 20. For example, by increasing the force exerted by compression spring 39 it is possible to increase the level of the portion of the curve labeled A. Next, the speed at which the portion A terminates and the torque increases sharply can be varied by changing the characteristics of the spring 52 and the sleeve 51. For example, the spring can be made stronger thereby increasing the speed at which the sleeve 51 will move radially outwardly of the hydrostatic coupling to close the aperture 50. The position and shape of the portion B of the curve can be varied by changing the force exerted by spring 39, by changing the mass of the parts which exert centrifugal force on the disc 36, and by changing relative effective pressure areas on the primary side of the disc 36 and the piston 38.

Finally, the point $B_1$ at which the line C commences, as well as the slope of line C, is determined by the force applied by the spring 56 to close the valve member 55 against seat 59. The point at which curve C commences is of considerable importance, and for that reason, in a preferred embodiment of the invention, there is shown a simplified means, such as a means 57, the position of which can be changed within the end piece 42 for regulating the magnitude of the force exerted by the spring 56.

Of course many modifications and variations are possible within the spirit and scope of the present invention. A modification is shown in FIGURE 8.

FIGURE 8 illustrates a construction for separating the main stem 32 from the outer portion 30. Here the stem, designated as 80, is formed integrally with ribs 81 which are constructed to fit tightly within recesses 82 around the periphery of passage 19. A separate valve seat structure is provided, such as shown at 83. This valve seat 83 may be held rigidly to the pump unit 14 by any convenient means such as, for example, bolts 84. In this embodiment there is also shown a slightly modified relationship between the valve disc 36 and the end of the piston 38. Here, the valve disc 36 sits within the raised portions 85 of the piston end wall 35.

Figure 9:
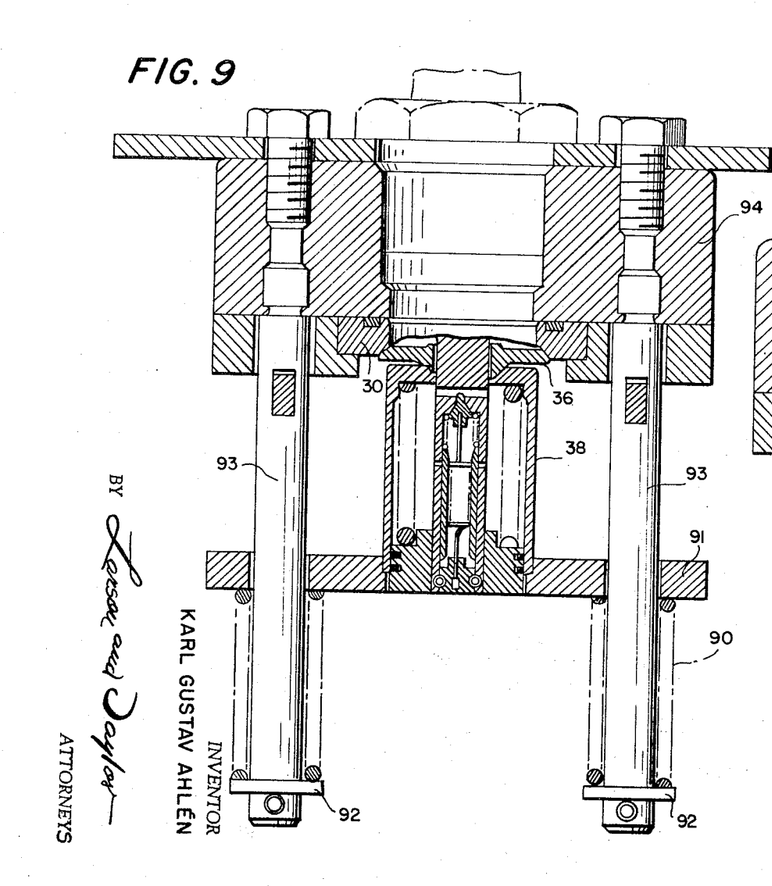
FIGURE 9 is a section taken through the center line of the valve mounted in a test rig.

FIGURE 9 shows the valve mounted in a test rig illustrating means for exerting an additional force such as spring force 90 against the piston 38 to replace the centrifugal forces on valve seat 30 at a static test. The springs 90 rest upon flanges 92 which are fixed on rods 93 connected to the casing 94.

Figure 10:
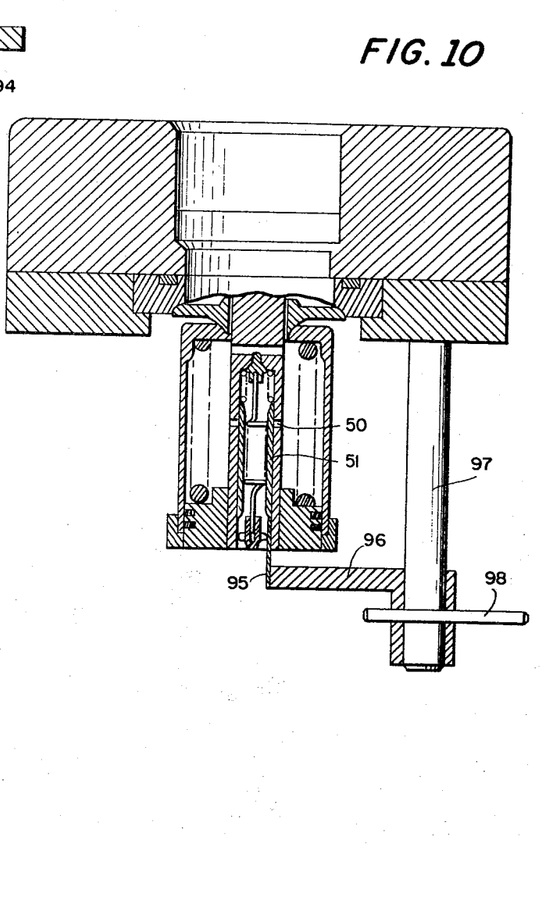
FIGURE 10 is a section view through the center of the valve also mounted in the test rig for static tests but with compensation for centrifugal forces.

FIGURE 10 illustrates a modified setting for providing an additional means for controlling the position of sleeve 51. The sleeve 51 rests upon a movable rod or plunger 95 rather than upon the fixed member 42. The position of the rod 95 can be controlled by moving the support member 96 along a rod 97 fixed to the casing and holding the same in a selected position by a pin 98.

I claim:

1. A modulating pressure valve for use in a hydrostatic coupling, clutch or the like comprising: a valve seat forming a passageway from a high pressure upstream side to a low pressure downstream side, a valve disc mounted to move against the valve seat to close the passageway and away from the valve seat to open the passageway, the said valve disc being mounted to be urged to an open position by the high pressure fluid on the upstream side acting upon the valve disc to open the same, a hydraulic cylinder having a first chamber therein, a piston operable under the influence of the fluid in the said first chamber to urge the valve disc against the valve seat, a restricted passage forming an inlet channel for conducting fluid from said high pressure side to the said first chamber, the effective area of the first chamber acting on the piston being less than the effective area of the valve disc on which the fluid on the high pressure side acts, an outlet opening from said first chamber to said low pressure side of the passage, and a first spring means for urging the valve disc against the valve seat.

2. A modulating pressure valve as claimed in claim 1 including a closing member for selectively closing the said outlet opening when a predetermined force is applied to said closing member in a direction towards the said valve disc, and a closing member spring means for urging the said closing member to open the said outlet opening.

3. A modulating pressure valve as claimed in claim 2 including a plunger means for applying the said predetermined force to the said closing member.

4. A modulating pressure valve as claimed in claim 2 including a second valve member separate from said closing member and normally closing said outlet opening, a second valve spring means for normally urging the said second valve to a closed position, said second valve and said second valve spring means being so constructed to permit the second valve to open to allow fluid to pass from the said first chamber through the said outlet opening when the pressure in the first chamber reaches a predetermined level.

5. A modulating pressure valve as claimed in claim 4 including an adjusting means for adjusting the level of the pressure in the first chamber which will be required to open the said second valve member.

6. A modulating pressure valve as claimed in claim 5 wherein the portion of the valve disc in contact with the valve seat is partially convexly spherical, the center of the said convexly spherical portion being located on the side of the valve disc opposite from the said spherical portion.

7. A modulating pressure valve as claimed in claim 6 in which the said disc is of a material sufficiently elastic to flex and thereby maintain line contact of the said spherical portion with the said valve seat even when the line of contact therebetween diverges from a true circle due to misalignment of the valve disc with respect to the said valve seat.

8. A modulating pressure valve as claimed in claim 7 including mating partially convexly spherical surfaces on the side of the valve disc away from the seat and on the piston engaged by the valve disc, said spherical surfaces having their centers on the opposite side of the valve disc.

9. A modulating pressure valve as claimed in claim 8 wherein said valve seat is partially spherical.

10. A modulating pressure valve as claimed in claim 8 wherein said valve seat is conical.

11. A modulating pressure valve as claimed in claim 1 including a second valve normally closing said outlet opening, a second valve spring means normally urging the said second valve to a closed position, and said second valve spring means being constructed to permit the second valve to open and allow fluid to flow from the said first chamber through the said outlet opening when the pressure of the fluid in the first chamber reaches a predetermined level.

12. A modulating pressure valve as claimed in claim 11 including an adjusting means for adjusting the level of the pressure in the first chamber which will be required to open the said second valve member.

13. A modulating pressure valve as claimed in claim 1 wherein the said valve seat is substantially circular in cross-section, and including a valve stem rigidly affixed with respect to the valve seat and extending along the axis of the circular valve seat in a direction away from the high pressure side thereof, the said valve disc being annular in shape and mounted on the valve stem and slidable therealong towards and away from the valve seat.

14. A modulating pressure valve as claimed in claim 13 wherein the said hydraulic piston cylinder is separate from the said valve disc and is mounted on the valve stem and slidable therealong to urge the valve disc towards the valve seat, an end plate fixed to the stem and extending radially outwardly therefrom, the annular space enclosed by the hydraulic piston cylinder, the stem, the end plate, and the piston forming the said first chamber.

15. A modulating pressure valve as claimed in claim 14 wherein the said outlet opening is located within the said stem and includes a first aperture from said first chamber to the interior of the stem and an outer opening from said stem interior to the low pressure side of the passageway, a closure member including a cylindrical sleeve mounted within the stem interior, a closure member spring acting upon the sleeve to urge the same to open the first aperture, said sleeve being adapted to be operated on by an external force to offset the force of the closure member spring thereby causing the sleeve to close the first aperture.

16. A modulating pressure valve as claimed in claim 15 including a second aperture from said first chamber to said stem interior and communicating with the said outer opening from the stem to the low pressure side of the passage, a second valve normally closing the second aperture under the influence of a second valve spring, said second valve spring acting to close the second valve in a direction perpendicular to the axis of the valve seat and towards the valve seat, said second valve operable to open against the force of the spring when the pressure in the first chamber reaches a predetermined level.

17. A modulating pressure valve as claimed in claim 16 including an adjusting means for regulating the amount of force applied to the second valve spring to urge the same to close the said second aperture.

18. A modulating pressure valve as claimed in claim 14 including a second aperture from said first chamber to said stem interior and communicating with an outer opening from the stem interior to the low pressure side of the passage, a second valve normally closing the second aperture under the influence of a second valve spring, said second valve spring acting to close the second valve in a direction perpendicular to the axis of the valve seat and towards the valve seat, said second valve operable to open against the force of the spring when the pressure in the first chamber reaches a predetermined level.

19. A modulating pressure valve as claimed in claim 14 including an external spring means acting upon the said hydraulic cylinder for urging the piston against the valve disc and thereby urging the valve disc against the valve seat.

20. A modulating pressure valve as claimed in claim 13 wherein the said stem is integral with the valve seat, separated therefrom by ribs.

21. A modulating pressure valve as claimed in claim 13 wherein the said valve stem is separate from the said valve seat and is rigidly attached to the passageway upstream from the valve seat.

22. A modulating pressure valve as claimed in claim 13 wherein the portion of the valve disc in contact with the valve seat is partially convexly spherical, and the portion of the valve disc in contact with the said piston is also partially convexly spherical, the centers of each of the said convexly spherical portions being located on the side of the valve disc opposite from the said respective portions.

23. A modulating pressure valve as claimed in claim 22 in which the said disc is of a material sufficiently elastic to flex and thereby maintain line contact of the first said convex spherical portion with the valve seat even when the line of contact therebetween diverges from a true circle due to misalignment of the valve disc with respect to the said valve seat.

24. A modulating pressure valve as claimed in claim 23 wherein the valve seat is spherical.

25. A modulating pressure valve as claimed in claim 23 wherein said valve seat is conical.

26. A hydrostatic coupling comprising a rotatably mounted central sun gear, a rotatably mounted housing coaxial with said sun gear and providing a main chamber for working fluid, a plurality of gear pumps carried by said housing in peripherally spaced relation to rotate therewith, each of said pumps mounted to be driven by said central gear to pump liquid from said main chamber to a high pressure chamber, and a modulating pressure valve for controlling the flow of fluid from the high pressure chamber back to the said main chamber, said valve comprising a valve seat forming a passageway from said high pressure chamber to said main chamber, a valve disc mounted to be moved radially outwardly away from the axis of the hydraulic coupling to engage the valve seat and close the said passage, and away from the valve seat to open the passageway, said valve disc being mounted to be urged to an open position by the pressure of the fluid in the high pressure chamber, a hydraulic cylinder having a first chamber therein and a piston operable under the influence of the fluid in the said first chamber to urge the valve disc against the valve seat, a restricted passage forming an inlet channel for conducting fluid from said high pressure chamber to the said first chamber, the effective area of the valve disc in the first chamber acting on the piston being less than the effective area of the valve disc on which the fluid in the high pressure chamber acts, an outlet opening from said first chamber to said main chamber and a first spring means for urging the valve disc against the valve seat.

27. A hydraulic coupling as claimed in claim 26 including a closure member for closing the said outlet opening when acted upon by centrifugal force as the outer casing of the hydraulic coupling rotates, and a closure member spring opposing the centrifugal force on the closure member thereby opening the said outlet opening allowing fluid to flow from the first chamber to the main chamber.

28. A hydraulic coupling as claimed in claim 27 including a second valve separate from said closure member normally closing said outlet opening, and a second valve spring means normally urging the said second valve in a direction radially outwardly from the axis of the hydraulic coupling to urge the second valve member to a closed position, said second valve and said second valve spring member being so constructed to permit the second valve to open to allow fluid to flow from said first chamber through said outlet opening when the pressure in the first chamber reaches a predetermined level.

29. A hydraulic coupling as claimed in claim 26 including a second valve member normally closing said outlet opening, a second valve spring normally urging the said second valve to a closed position, said second valve spring member acting upon the second valve to close the same in a direction radially outwardly from the axis of the hydraulic coupling, said second valve member and second valve spring means being constructed to permit the second valve to open to allow fluid to flow from the first chamber to the main chamber when the pressure in the first chamber reaches a predetermined level.

30. A hydraulic coupling as claimed in claim 26 wherein the said pressure valve includes a stem directed inwardly from the plane of the valve seat along a radius of the hydraulic coupling, said stem being rigidly affixed with respect to the outer housing and the valve seat, said valve disc, said piston, and said hydraulic cylinder each being annular in shape and being mounted on and slidable along the said stem, the end of said stem away from the valve seat being hollow, apertures opening from said first chamber to the interior of said valve stem, and said outlet opening being an outer opening from the interior of said valve stem to the main chamber, and the said closure member and the said second member being located within said valve stem.

31. A valve mechanism comprising an apertured element providing an annular valve seat in the form of a surface of revolution, a valve disc capable of movement towards and away from said seat, and an actuating member for engaging and moving the valve disc, a convex spherical valve face surface on the side of the said valve disc adapted to engage the seat, the opposite side of the said valve disc having a convex spherical seat surface formed thereon, and a pressure face in the form of a surface of revolution on said actuating member engaging said spherical seat surface for exerting a closing pressure on said valve disc, the spherical center of said spherical valve face surface and the spherical center of said spherical seat surface each being located on the side of the disc opposite from its respective spherical surface.

32. A valve mechanism as claimed in claim 31 in which the said valve is in the form of a disc sufficiently elastic to flex to maintain the line contact between the valve disc and the valve seat when the line of contact therebetween diverges from a true circle due to misalignment of the valve disc with respect to the said valve seat.

33. A mechanism as claimed in claim 31 in which the said valve seat is conical.

34. A mechanism as defined in claim 31 in which the valve seat is spherical.

References Cited

UNITED STATES PATENTS

| 1,688,852 | 10/1928 | Christie | 192—61 |
|---|---|---|---|
| 2,329,594 | 9/1943 | Corrigan | 192—61 |
| 2,377,350 | 6/1945 | Marsh | 192—61 |
| 2,502,092 | 3/1950 | Jessup | 192—61 |
| 2,564,848 | 8/1951 | Jessup | 192—61 |
| 2,652,911 | 9/1953 | Somers | 192—61 |
| 2,839,889 | 6/1958 | McGill | 192—61 |
| 2,900,999 | 8/1959 | Courtot | 251—334 |
| 2,913,083 | 11/1959 | Bachle et al. | 192—61 |
| 2,931,472 | 4/1960 | Ahlen | 192—61 |
| 2,998,957 | 9/1961 | Vulliez | 251—86 |
| 3,150,751 | 9/1964 | Peone | 192—61 |
| 3,155,367 | 11/1964 | Gifford | 251—86 |
| 3,231,144 | 12/1966 | Rouantet et al. | 251—86 |

FOREIGN PATENTS 1,156,542  12/1957  France.

JULIUS E. WEST, *Primary Examiner.*

ALLAN D. HERRMANN, *Assistant Examiner.*

U.S. Cl. X.R.

192—103, 105; 251—86, 334